(12) United States Patent
Seol et al.

(10) Patent No.: US 9,941,586 B2
(45) Date of Patent: Apr. 10, 2018

(54) BEAM DIRECTION SELECTION METHOD AND APPARATUS FOR USE IN BEAMFORMING SYSTEM

(71) Applicants: Samsung Electronics Co., Ltd, Gyeonggi-do (KR); Korea Advanced Institute of Science and Technology, Daejeon (KR)

(72) Inventors: Jiyun Seol, Gyeonggi-do (KR); Inhye Son, Daegu (KR); Taeseung Lee, Seoul (KR); Joohwan Chun, Daejeon (KR); Sanghyouk Choi, Chungcheongbuk-do (KR); Taeyoung Kim, Gyeonggi-do (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 969 days.

(21) Appl. No.: 14/084,388

(22) Filed: Nov. 19, 2013

(65) Prior Publication Data
US 2014/0139372 A1 May 22, 2014

(30) Foreign Application Priority Data
Nov. 19, 2012 (KR) .......... 10-2012-0130874

(51) Int. Cl.
*H01Q 3/26* (2006.01)
*H04B 7/08* (2006.01)
(Continued)

(52) U.S. Cl.
CPC ............ *H01Q 3/2605* (2013.01); *G01S 3/28* (2013.01); *H01Q 3/24* (2013.01); *H04B 7/086* (2013.01); *H04B 7/088* (2013.01); *H04B 7/0695* (2013.01)

(58) Field of Classification Search
CPC ...... H04B 7/088; H04B 7/086; H01Q 3/2605; H01Q 3/24; G01S 3/043; G01S 3/06;
(Continued)

(56) References Cited

U.S. PATENT DOCUMENTS 6,377,213 B1 * 4/2002 Odachi ............... G01S 3/48
342/372

OTHER PUBLICATIONS

IEEE Std 802.15.3c—2009, "Part 15.3: Wireless Medium Access Control (MAC) and Physical Layer (PHY) Specifications for High Rate Wireless Personal Area Networks (WPANs)", IEEE Computer Society, Oct. 12, 2009, 203 pages.
(Continued)

*Primary Examiner* — Cassi J Galt

(57) ABSTRACT

A method and apparatus for selecting a beam direction is for use in a beamforming system. The beam direction selection method of a reception device having a plurality of antenna elements in a wireless communication system using beamforming according to the present disclosure includes acquiring a first reception beam angle estimated as optimal by allocating a first predetermined number of antenna elements to each of beam ports and scanning signals and acquiring a second reception beam angle estimated as optimal by allocating a second predetermined number of antenna elements, which is greater than the first predetermined number, to some of the beam ports and scanning the signals using the first reception beam angle.

The beam selection apparatus and method of the present disclosure is capable of selecting a reception beam direction efficiently in a beamforming system.

20 Claims, 19 Drawing Sheets

(51) Int. Cl.
*G01S 3/28* (2006.01)
*H01Q 3/24* (2006.01)
*H04B 7/06* (2006.01)

(58) Field of Classification Search
CPC ..... G01S 3/16; G01S 3/18; G01S 3/28; G01S 3/30; G01S 3/72
See application file for complete search history.

(56) References Cited

OTHER PUBLICATIONS

IEEE P802.11ad/D0.1, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Enhancements for Very High Throughput in the 60GHz Band", Jun. 2010, 357 pages.

Erik Dalman, et al., "4G LTE/LTE-Advanced fo Mobile Broadband", published 2011, 445 pages.

\* cited by examiner

BEAM DIRECTION SELECTION METHOD AND APPARATUS FOR USE IN BEAMFORMING SYSTEM

CROSS-REFERENCE TO RELATED APPLICATION(S) AND CLAIM OF PRIORITY

The present application is related to and claims the benefit under 35 U.S.C. § 119(a) of a Korean Patent Application filed on Nov. 19, 2012 in the Korean Intellectual Property Office and assigned Serial No. 10-2012-0130874, the entire disclosure of which is hereby incorporated by reference.

TECHNICAL FIELD

The present disclosure relates to a method and apparatus for selecting a beam direction in a beamforming system.

BACKGROUND

With the rapid development of wireless communication technology, user requirements have increased. The applications of the wireless communication terminal are required to process large amounts of communication data. The users want to transmit and receive data at a higher speed. There are many methods proposed to meet such requirements with efficient use of radio frequency resource.

In the beamforming system, the User Equipment (UE) or Mobile Station (MS) has no way of knowing the optimum beam among the beams transmitted by the evolved Node B (eNB) or Base Station (BS) at the time of initial access or after the MS location or other environmental condition changes. The MS also has no way of knowing the best beam among the beams received. This is the case too for the beams transmitted by the MS and received by the BS. Thus, it is necessary for the MS and the BS to search for the best transmission/reception beam efficiently.

In Institute of Electrical and Electronics Engineers (IEEE) 802.15.3c and IEEE 802.11ad, a beam search method for Wireless Local Area Network (LAN)/Personal Area Network (PAN) has been proposed. The standard specifies the beamforming in the wireless PAN/LAN environment in the 60 GHz band which is higher than the legacy mobile communication frequency band. In this case, the significant power reduction occurs as the distance between the transmitter and the receiver increases due to the high frequency band. Accordingly, the beamforming technique is important in the high frequency band.

SUMMARY

To address the above-discussed deficiencies, the present disclosure provides an efficient beam selection apparatus and method for use in the beamforming system.

In accordance with certain embodiments of the present disclosure, a beam direction selection method of a reception device having a plurality of antenna elements in a wireless communication system using beamforming includes: acquiring a first reception beam angle estimated as optimal by allocating a first predetermined number of antenna elements to each of beam ports and scanning signals; and acquiring a second reception beam angle estimated as optimal by allocating a second predetermined number of antenna elements, which is greater than the first predetermined number, to some of the beam ports and scanning the signals using the first reception beam angle.

In accordance with certain embodiments of the present disclosure, a reception beam direction selection apparatus in a wireless communication system using beamforming includes: a plurality of antenna elements and a controller. The controller acquires a first reception beam angle estimated as optimal by allocating a first predetermined number of antenna elements to each of beam ports and scanning signals and acquires a second reception beam angle estimated as optimal by allocating a second predetermined number of antenna elements, which is greater than the first predetermined number, to some of the beam ports and scanning the signals using the first reception beam angle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
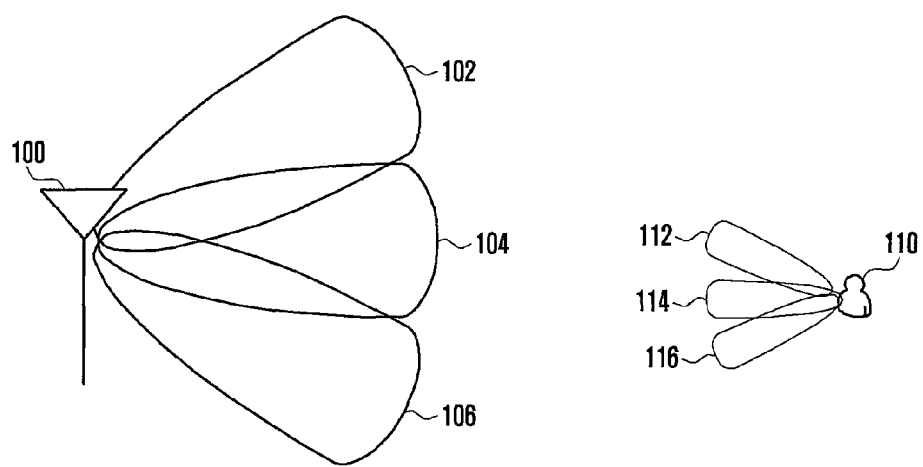
FIGS. 1 and 2 illustrate a beam search method according to the other technology.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system. Advantages and features of the present disclosure and methods of accomplishing the same may be understood more readily by reference to the following detailed description of embodiments and the accompanying drawings. The present disclosure can, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Descriptions of the beam selection method and apparatus according to embodiment of the present disclosure refer to accompanying drawings.

In the following description, the angle of a beam is the angle between a predetermined reference line and the center line of the coverage area of the corresponding beam. It is possible to adjust the angle of the reception beam by adjusting the phase shifters connected to the respective antenna elements, there may be differences between the angle of the reception beam intended according to the device error and other environmental variables and the reception angle showing the best performance. Unless otherwise stated, it is assumed that the angle error of the reception beam is negligible.

Figure 2:
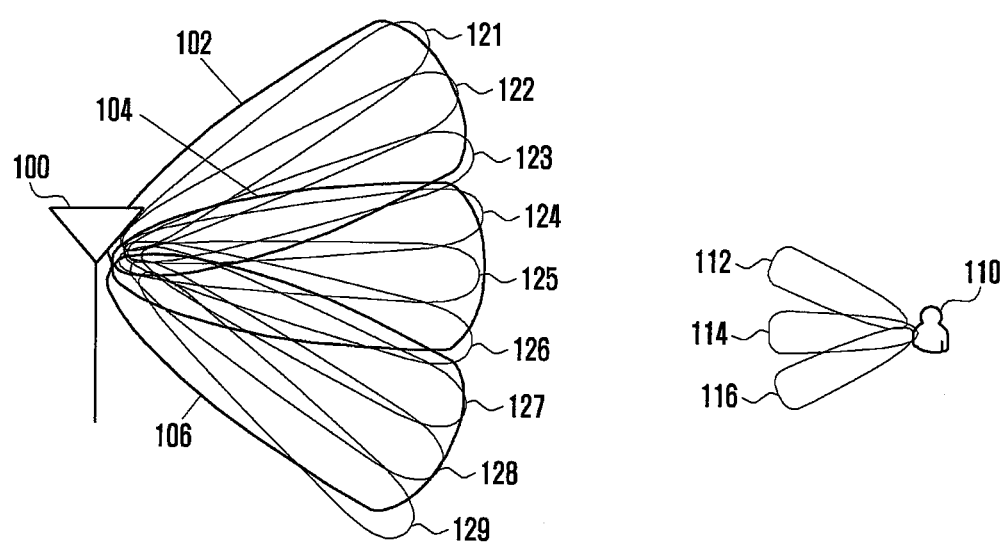

FIGS. 1 and 2 show a best beam search methods according to other technology. In FIGS. 1 and 2, the beams are all fixed beams. The BS 100 and the MS 110 perform the process of FIG. 1 and then the process of FIG. 2 based thereon to search for the best beam.

Referring to FIG. 1, the BS 100 and the MS 110 perform the best cell search in unit of beam sector. This process is referred to as sector level training or sect sweep. Here, the beam sector denotes the concept of a set of at least two adjacent beams. In the process of FIG. 1, the BS 100 transmits reference signal and signal for measuring other channel state for the combinations of the transmission beam sectors 102, 104, and 106 of the BS 100 and the reception beams 112, 114, and 116 of the MS 110; and the MS measures the signals to check the channel state. For example, the BS 100 transmits a signal in the first transmission beam sector 102, and the MS 110 receives the first reception beam 112. Next, the BS 100 transmits a signal in the first beam sector 102, and the MS 110 receives the second reception beam 114. In this way, the channel measurement is performed to the combination of the entire transmission beam sectors 102, 104, and 106 and the reception beams 112, 114, and 116. The channel measurement result can be Signal to Noise Ratio (SNR) or similar channel state information. The BS 100 and/or the MS 110 are capable of selecting the best transmission beam sector-reception beam combination based on the channel measurement result. If the transmission beam sector-reception beam combination is selected, the process of FIG. 2 is performed. For example, the combination of the second transmission beam sector 104 and the second reception beam 114 may show the best SNR and thus be selected as the best combination.

FIG. 2 shows the relationships between the transmission beam sectors 102, 104, and 106 and the transmission beams 121 to 129. The first transmission beam sector 101 corresponds to the transmission beams 121, 122, and 123. Likewise, the second transmission beam sector 104 corresponds to the transmission beams 124, 125, and 126. The third transmission beam sector 106 corresponds to the transmission beams 127, 128, and 129. As aforementioned, since the second transmission beam sector 104 has been selected, the transmission beams 124, 125, and 126 become the best transmission beam candidates. In the case of reception beams of the MS 110, since no reception beam sector is applied, the second reception beam 114 is determined as the best reception beams and tested. The BS 100 and the MS 110 transmit the signal for the combination of the transmission beams 124, 125, and 126 and the second beam 114 in the same way and select the best transmission and reception beams according to the channel state. The process depicted in FIG. 2 is referred to as beam level training or beam refinement.

Although the concept of sector is not applied to the reception beam of the MS 110 in the method described with reference to FIGS. 1 and 2, it can be applied to the reception beams of the MS 110 like the transmission beams of the BS 100. In contrast, the same concept may be applied to the transmission beams of the MS 110 and the reception beams of the BS 100.

Suppose the number of transmission beams of the BS 100 is N and the number of reception beams of the UE 110 is N. In the case of not adopting the sector concept, $N^2$ signal transmissions and channel estimations are required and this means $N^2$ time slots are consumed for selecting the best beam. Unlike this, if the entire (transmission/reception) beams are sorted into M sectors and each sector includes K beams, the use of the sector concept is advantageous of reduction of the number of time slots to $M^2+K^2(N^2>M^2+K^2)$.

However, the other method can be used only for the fixed beams but not the adaptive beams. The other method for selecting one of fixed beams is inferior to the adaptive beam selection method in view of beam gain efficiency. The other method also has a drawback in that when a beam is selected incorrectly it is difficult correct the error to recover the performance. Also, the other method is designed under the assumption of wireless PAN/LAN and thus difficult to adopt to the cellular environment.

According to Beam Division Multiple Access (BDMA) cellular system, if there is a plurality of beam ports it is necessary to prepare the lines as much as the number of beam ports for the respective antenna element and connect the line to the phase shifter. In the case that there are a large number of beam ports and antenna elements, it is very difficult to implement the system. Also, it is difficult to implement the communication links in the BDMA cellular system. In the initial downlink (DL) communication establishment procedure, the UE has to be tuned to the best reception beam based on the Primary Synchronization Signal (PSS) broadcast, and this procedure has to be performed promptly to support the network entry and handover of the new UE.

Figure 3:
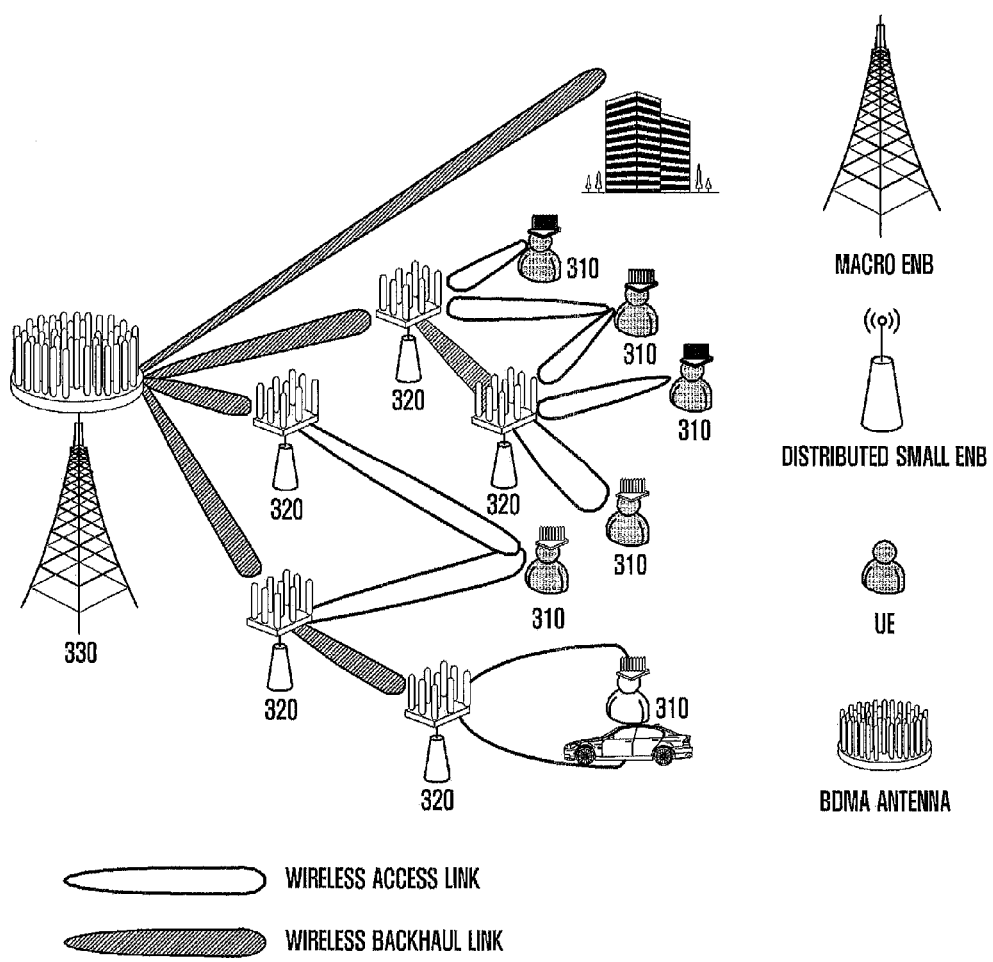
FIG. 3 illustrates network architecture of the beamforming system according to embodiments of the present disclosure.

FIG. 3 illustrates a network architecture of the beamforming system according to embodiments of the present disclosure. Beamforming is one of the most promising technologies for efficient use of radio frequency resource.

Referring to FIG. 3, the beamforming system according to embodiments of the present disclosure includes a macro eNB 330, distributed small eNBs 320, and UEs 310. The macro eNB 330, the distributed small eNBs 320, and the UEs 310 are provided with BDMA antennas or other types of antenna elements respectively. The macro eNB 330 is the eNB equipped with all the communication system functions of network layer, Radio Frequency (RF), Media Control Access (MAC) layer, and Physical (PHY) layer. The distributed small eNB 320 is the eNB equipped with some of the functions of the macro eNB 330 such as RF and PHY layer functions.

The UE 310 receives direct communication service from the macro eNB 330 and communication service through the distributed small eNB 320. The distributed small eNB 320 and the UE 330 are connected through a radio access link. The distributed small eNB 320 and the macro eNB 310 are connected through a wireless backhaul link. The two different distributed small eNBs 320 are connected through the wireless backhaul link. In the case that the UE 310 is served by the macro eNB 330, the UE 310 and the macro eNB 330 are connected through a wireless access link.

Embodiments of the present disclosure provide a method for a recipient device to select the best reception beam efficiently in configuring the connection through radio access link or wireless backhaul link. In certain embodiments, the method of is applicable to the system implemented with the macro eNB 330 and the UE 310 without distributed small eNB 320.

Figure 4:
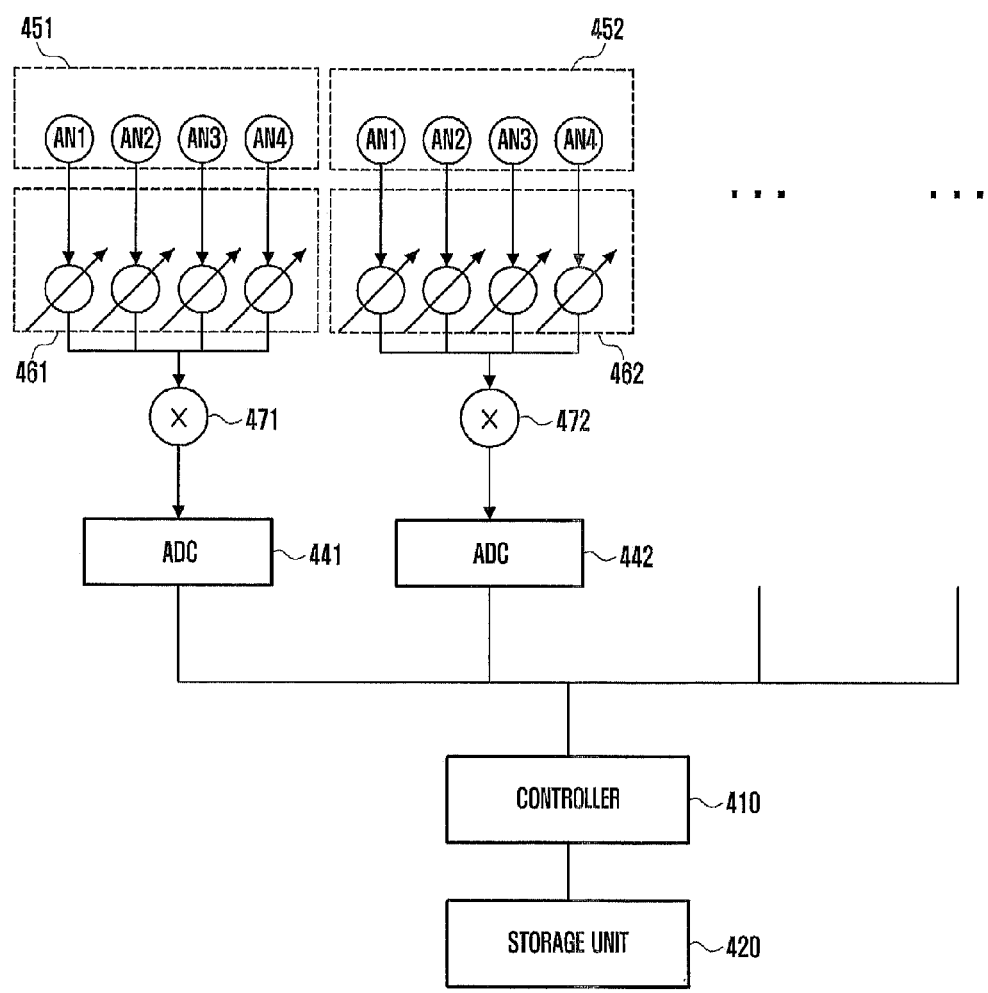
FIG. 4 illustrates a reception device according to embodiments of the present disclosure.

FIG. 4 illustrates a reception device according to embodiments of the present disclosure.

Referring to FIG. 4, the reception device according to embodiments of the present disclosure includes a plurality of antenna elements 451 and 452, a plurality of phase shifters 461 and 462, summers 471 and 472, analog-digital converters (ADCs) 441 and 442, a controller 410, and a storage unit 420. The reception device further includes a component for user interface such as display screen, input buttons, touchscreen, speaker, and microphone or a component for radio transmission. However, only the components for key operations according to this embodiment are depicted in FIG. 4. The four antenna elements 451 are connected to one phase shifter 461. The controller 410 controls the shift values of the phase shifters 461 to adjust the direction of the beam formed by the antenna elements. The input signals to the antenna elements 451 are transferred to the phase shifters 461 which shift the phases of the input signals. The phase shifted signals are summed by the summer 471 and then converted to a digital signal by the A/D converter 441.

The controller 410 allocates at least one antenna element to one beam port. The controller 410 configures the direction of the corresponding beam port. The controller 410 allocates the antenna elements AN1, AN2, AN3, and AN4 to the beam port A if necessary. In the case that the controller 410 intends to set the direction of the beam port A to angle B, the control unit 410 adjusts the shift values of the phase shifters connected to the antenna elements AN1, AN2, AN3, and AN4 to adjust the direction of the beam. Unless otherwise stated, the beam direction configuration is performed by adjusting the shift values of the phase shifters.

The controller 410 adjusts the number of antennas of one port if necessary. In the following description, it is assumed that one beam port is allocated consecutive antenna elements for beamforming efficiency. For example, although it is possible to allocate AN1, AN2, AN3, and AN4 to one beam port among the antenna elements AN1, AN2, . . . , AN15, and AN16 aligned in series; it is impossible to allocate AN1, AN2, AN5, and AN6 or AN1, AN3, AN4, and AN5 to one beam port. In an alternative embodiment, however, it is possible to allocate non-adjacent and inconsecutive antenna elements to be allocated to one beam port with putting up with performance degradation to some extent.

The antenna elements perform the role of the antenna elements for transmitting signals. In this case, the controller 410 controls the antenna elements to transmit signals. A detailed description of the signal transmission operation with the antenna elements is omitted herein.

Allocating a plurality of antenna elements to one beam port can be implemented in a way of adjusting the phase shifters connected to the corresponding antenna elements to tune to the beam direction and summing the signals received by the antenna elements and phase-shifted into one. The sum of the phase shifted signals becomes the received signal of the corresponding beam port. In the following, the descriptions of the phase shift procedure and the reception procedure of the antenna elements may be omitted herein. Unless otherwise stated, the controller 410 acquires the reception signal of the beam ports in such a way of receiving the input signal by means of the antenna elements and summing the signals phase-shifted by the phase shifters connected to the antenna elements.

The storage unit 420 stores the beam direction configuration information, information for use in identifying the antenna elements allocated to each beam port, and information for other data communication temporarily or semi-consistently.

Although 8 antenna elements 451, 8 phase shifters 461 and 462, two summer 471 and 472, and two ADCs 441 and 442 are depicted in FIG. 1, it is also possible that the reception device includes a few hundred antenna elements and corresponding numbers of phase shifters, summers, and ADCs.

Figure 5:
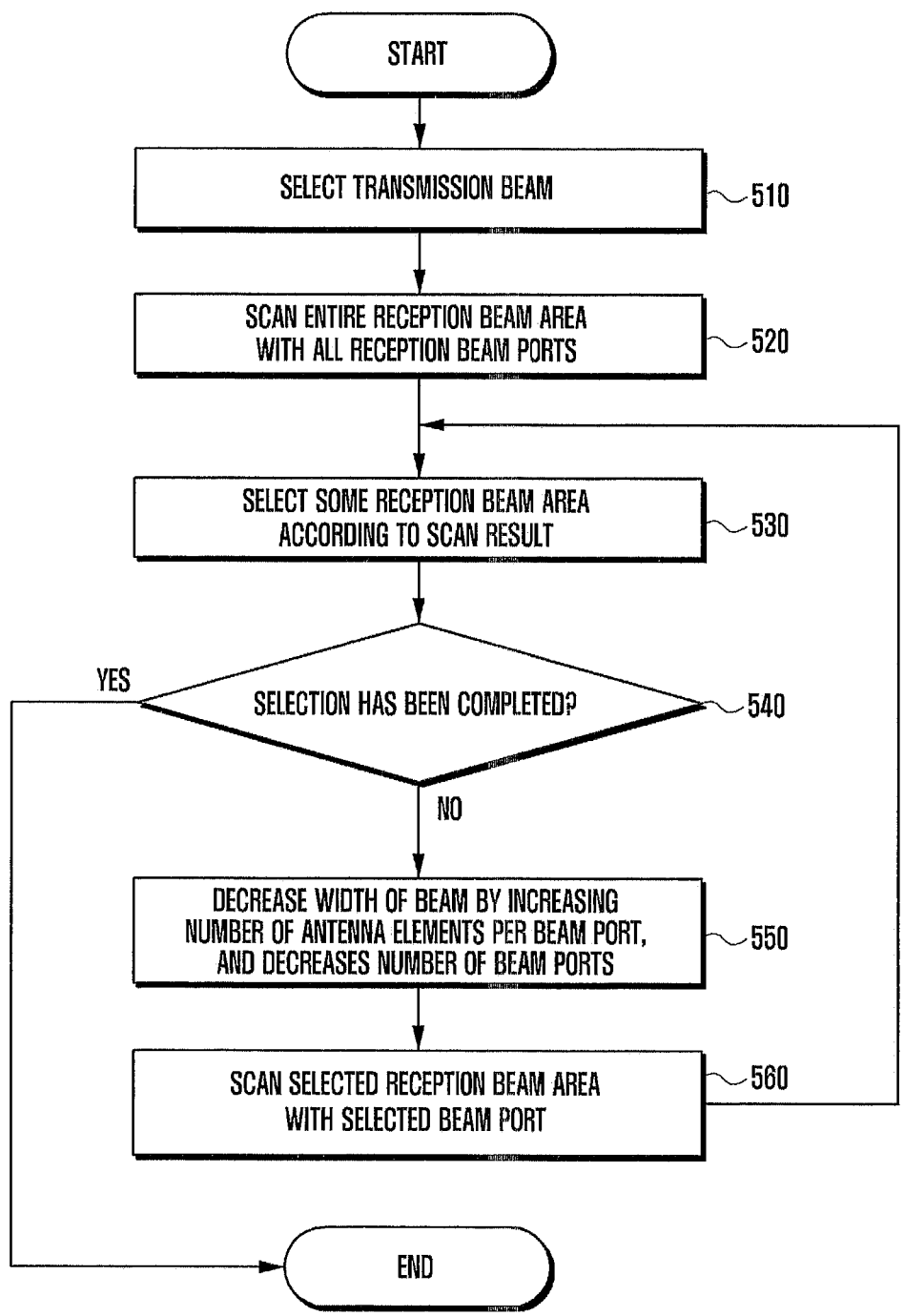
FIG. 5 illustrates a beam selection procedure of the recipient device according to embodiments of the present disclosure.

FIG. 5 illustrates a beam selection procedure of the recipient device according to embodiments of the present disclosure.

Referring to FIG. 5, the recipient device selects a transmission beam at operation 510.

Figure 6:
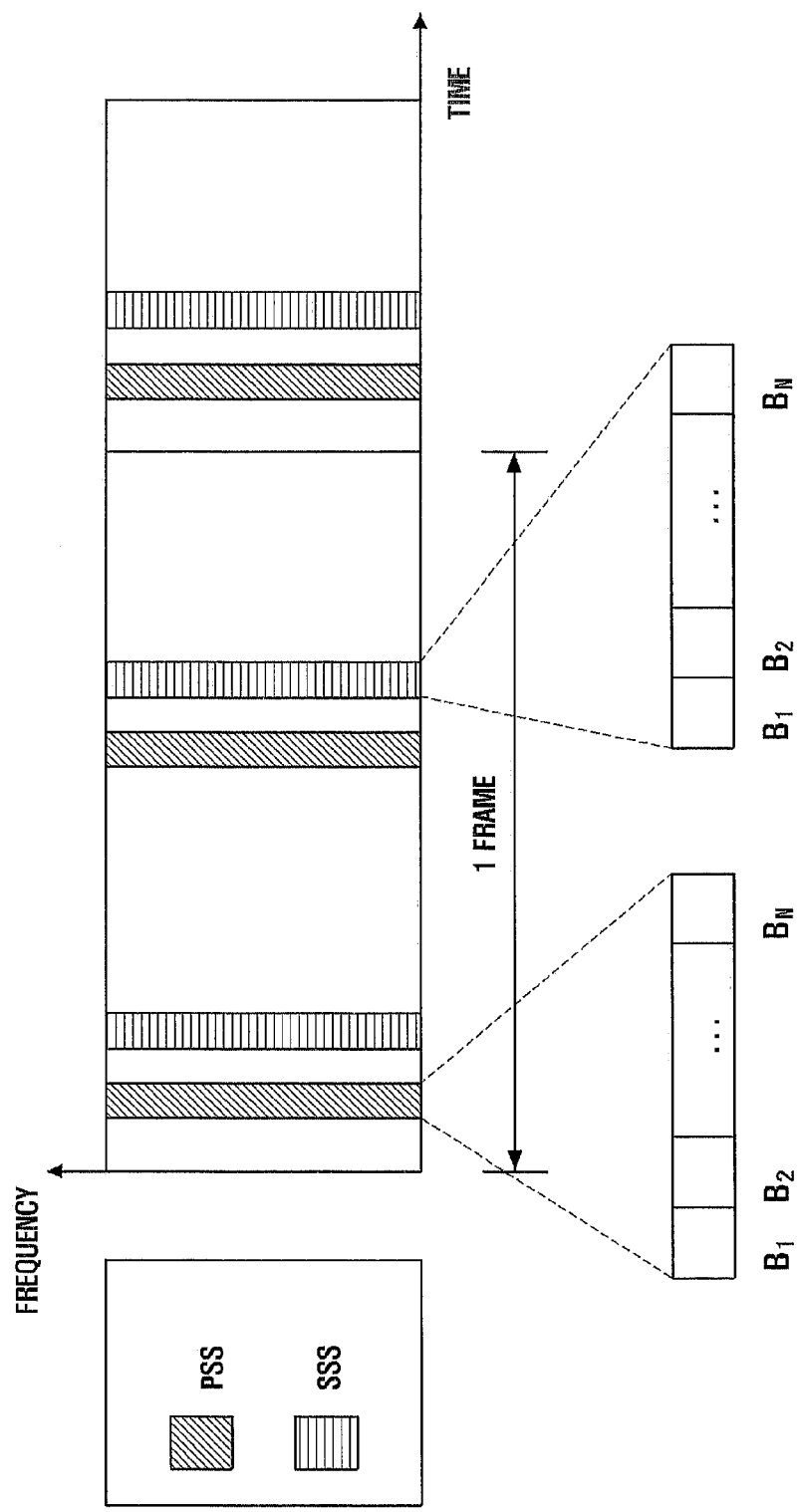
FIG. 6 illustrates the position of the synchronization signal in the structure of the frame transmitted by the transmission device according to embodiments of the present disclosure.

FIG. 6 illustrates the position of the synchronization signal in the structure of the frame transmitted by the transmission device.

Referring to FIG. 6, a Primary Synchronization Signal (PSS) and a Secondary Synchronization Signal (SSS) are transmitted in one frame duration. It is assumed that the transmission device operates with N transmission beams (B1, B2, . . . , BN). The transmission device transmits PSS through N transmission beams (B1, B2, . . . , BN) in series. For example, the transmission device transmits PSS in the first time slot through transmission beam B1 and then immediately transmits PSS again in the next time slot through the transmission beam B2. Likewise, the SSS is transmitted in the same manner as the PSS.

The reception device receives PSS and/or SSS in the entire angle area through all reception beam ports initially. The reception device selects the best transmission beam according to the PSS and/or SSS reception result. In the case of using PSS, the reception device receives the signal transmitted through the transmission beam B1 in the PSS time duration and measure the channel state (e.g., SINR), at the respective reception beam ports. The reception device acquire the channel information on all transmission beams. The reception device acquires average value of the channel state indicators (e.g. SINRs) at all of the reception beam ports for the respective transmission beams and selects a transmission beam estimated as the best transmission beam using the average channel state value corresponding to the respective transmission beams. Although the average value is used herein, it is also possible to select the transmission beams using the maximum value of the channel states measured to the corresponding transmission beam or average value and standard deviation of the channel states measured to the corresponding transmission beam. In certain embodiments, it is possible to use a part of the reception beam ports or a part of the entire angle area.

It is the aim to select the transmission beam almost best at operation 510 and, if this aim is achievable, other transmission beam selection methods can be used. If the transmission device receive an indicator indicating a transmission beam from the recipient device in a separated method, it is possible to select the transmission beam indicated by the indicator without extra selection process. Instead of the synchronization signals (PSS and SSS), other types of signals transmitted at different timings according to the transmission beam can be used for transmission beam selection.

The recipient device configures the reception beam by reducing the width of the reception beam and number of reception beam ports through operations 520 to 560.

Figure 7:
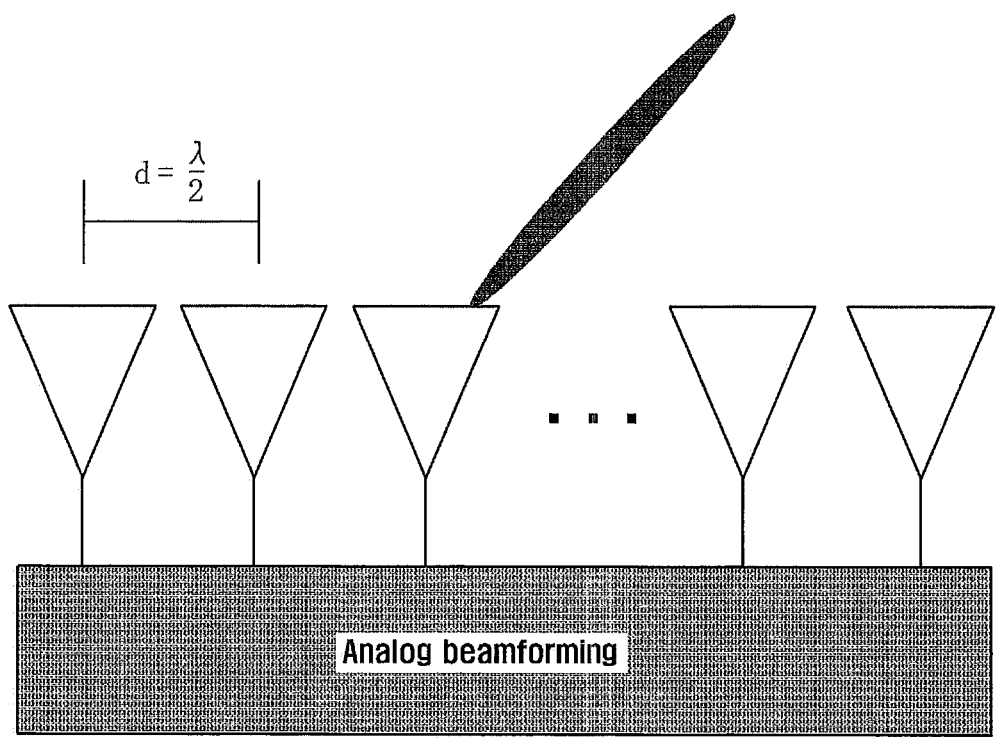
FIGS. 7 and 8 illustrates array antennas according to embodiments of the present disclosure.
Figure 8:
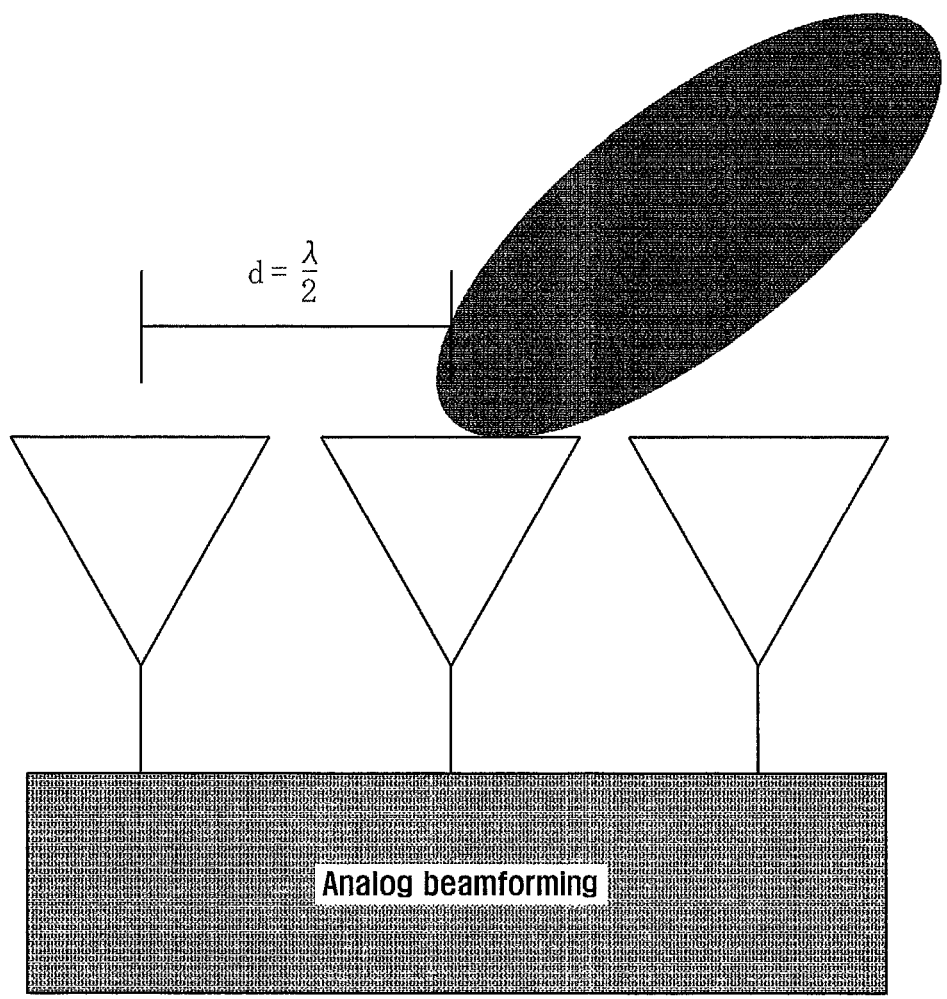

FIGS. 7 and 8 illustrate array antennas according to embodiments of the present disclosure. In the drawings, the antenna elements are arranged in series at a regular distance (d=λ/2). Here, λ denotes the wavelength of the received signal. In the procedure of FIG. 5, at least five consecutively arranged antenna elements are used for an analog beamforming port. In the case of FIG. 6, three consecutively arranged antenna elements are used for an analog beamforming port. If a large number of antenna elements are used for one analog beamforming port, the aperture size increases such that a narrow (sharp) beam is formed. In contrast, if a small number of antenna elements are used for one analog beamforming port, the aperture size decreases such that a relatively broad beam is formed.

The broad beam cover relatively broad area but its signal strength and accuracy are relatively weak. In contrast, the narrow beam covers relatively narrow area but its signal strength and accuracy are relatively strong.

In this embodiment, the feature described with reference to FIGS. 7 and 8, in which the width of a beam becomes narrow as the number of antenna elements used increases.

Returning to FIG. 5, the recipient device scans the entire area in which reception beam may be located using all the reception beam ports at operation 520.

Figure 9:
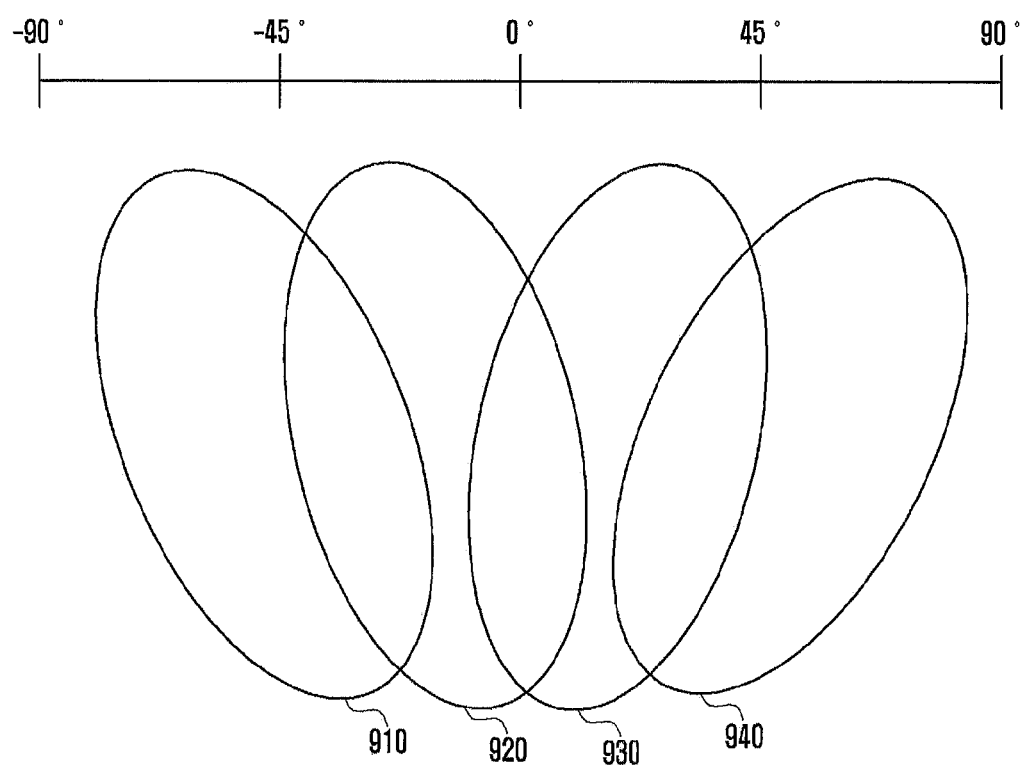
FIG. 9 illustrates how to scan the entire area in the beam selection procedure of the recipient device of FIG. 5.

FIG. 9 illustrates how to scan the entire area at operation 520 of FIG. 5. For convenience of explanation, the angle of the reception beam is expressed on vertical line. Although only the angle in the horizontal direction (one direction) is considered herein, the method of the present embodiment can be applied in similar manner to the case where the angle in the vertical direction is considered together.

Figure 10:
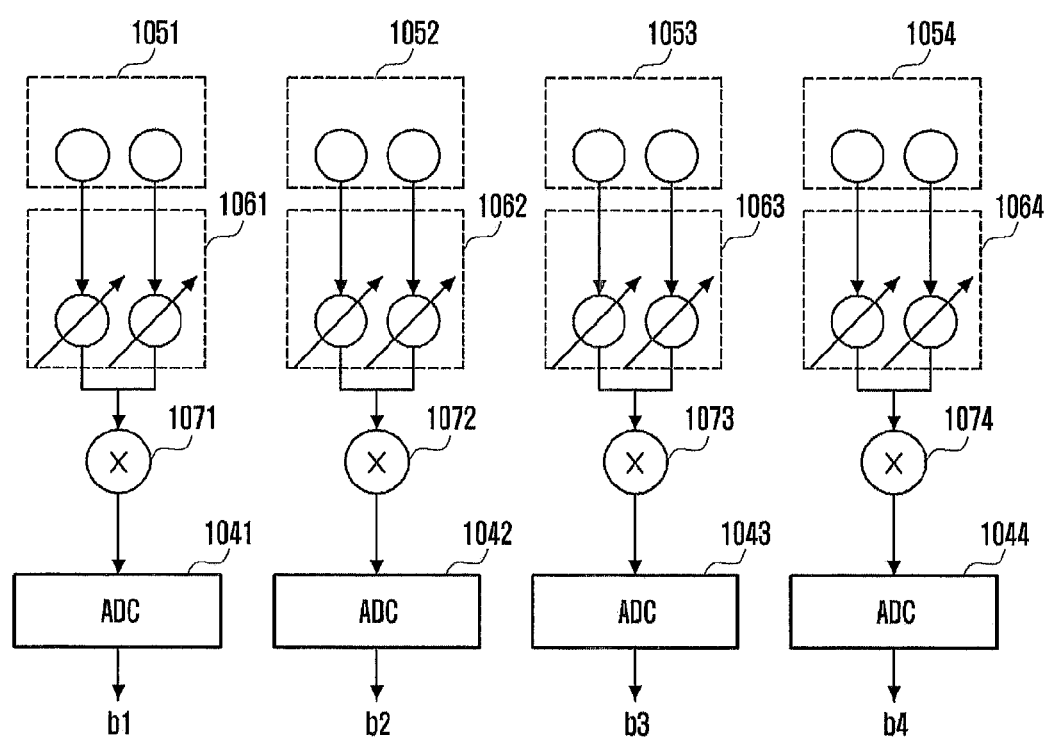
FIG. 10 illustrates beamforming configuration of the recipient device for scanning entire area in the beam selection procedure of the recipient device of FIG. 5.

FIG. 10 illustrates beamforming configuration of the recipient device for scanning entire area at operation 520 of FIG. 5.

In this embodiment, the recipient device includes eight antenna elements 1051, 1052, 1053, and 1054, eight phase shifters 1061, 1062, 1063, and 1064, and summers 1071, 1703, 1073, and 1074, and four ADCs 1041, 1042, 1043, and 1044. In an alternative embodiment, the numbers of respective components can change. The antenna elements 1051, 1052, 1053, and 1054 can be arranged in series at a regular distance (d=λ/2) as shown in FIG. 10. The arrangement of antenna elements can change depending on the embodiment.

Since the number of ADCs of the recipient device is 4, the recipient device configures up to 4 reception beam ports b1, b2, b3, and b4. The beam ports b1, b2, b3, and b4 correspond to the reception beams 910, 920, 930, and 940. The controller 410 configures the phase shift values of the phase shifters such that the direction angles of the reception beams 910, 920, 930, and 940 become −67.5, −22.5, 22.5, and 67.5 degrees respectively. In the state that the direction angles of the reception beams 910, 920, 930, and 940 are set to −67.5, −22.5, 22.5, and 67.5 degrees, the recipient device receives the synchronization signal (PSS or SSS) transmitted by the transmission device. Particularly, the recipient device receives the signal in the time slot (or other time duration) corresponding to the transmission beam selected at operation 510 and select the area for scanning next based on the channel information. Although it is assumed that the entire area is in the range of ~90 to approximately 90 degrees (that is, ~90 degrees), the range of the entire area can be changed in an alternative embodiment. Also, the angles of the respective beams 910, 920, 930, and 940 are not restricted to −67.5, −22.5, 22.5, and 67.5 degrees. It is enough for the recipient device to adjust the four beams 910, 920, 930, and 940 to cover the entire area appropriately and efficiently.

The recipient device receives the synchronization signal which is transmitted in the same time slot (or other time duration) through four beams 910, 920, 930, and 940 and which is of the transmission beam selected at operation 510 and estimate the optimal reception time based on the reception result (i.e., received signal power).

In the case that the same reception beam as FIG. 9 is used at operation 510, it is possible to use the channel station information measured at operation 510 without new channel measurement or new signal reception at operation 520. That is, the channel state information on combinations of all transmission beams and reception beams is acquired at operation 510, and it is possible, at operation 520, to use the channel state information on the transmission beam selected at operation 510 as it is.

Figure 11:
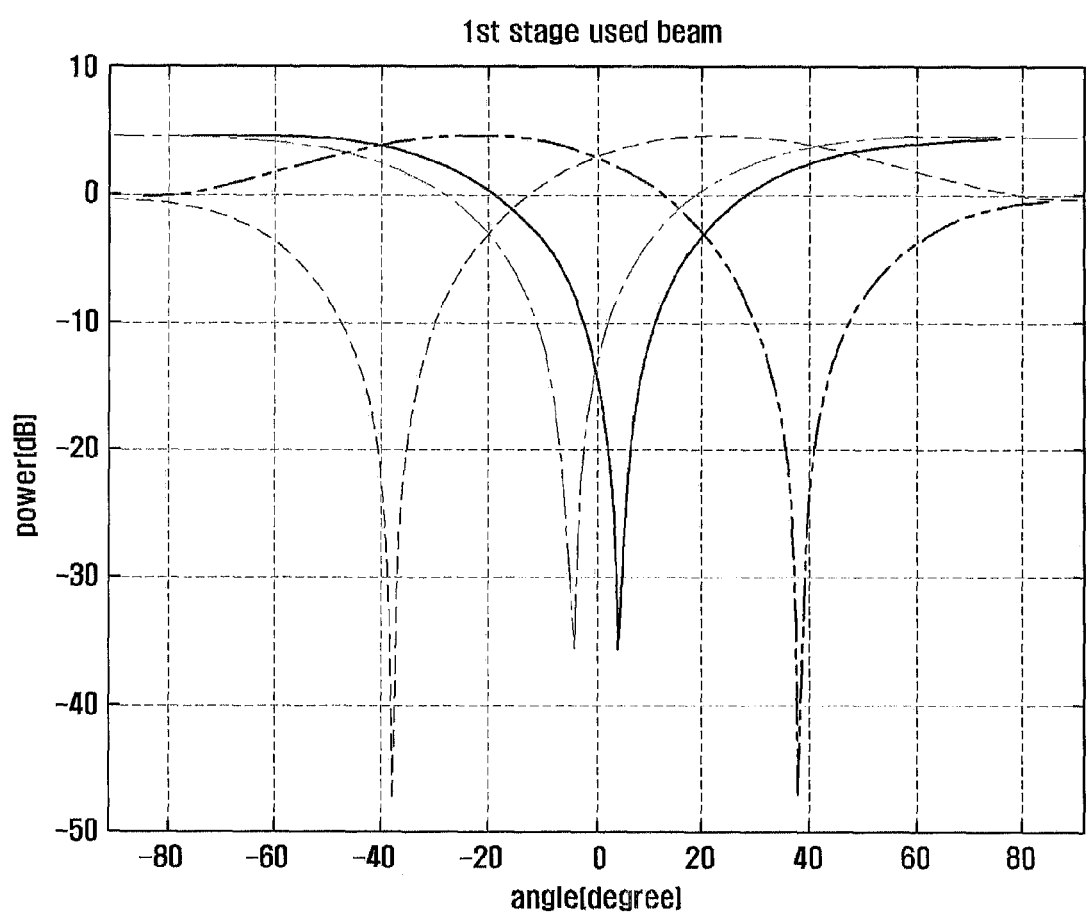
FIG. 11 illustrates a graph of the reception powers of the respective reception beams of FIG. 9.

FIG. 11 illustrates a graph of the reception powers of the respective reception beams of FIG. 9.

In FIG. 11, the horizontal axis denotes the reception angle of the signal, and the vertical axis denotes the reception powers at the respective reception angles. The beams 910, 920, 930, and 940 show the best performances when they are received at −67.5, −22.5, 22.5, and 67.5 degrees.

The recipient device selects an area (optimal estimation area) estimated to be close to the angle of the best reception beam in the angle area (−90 to 90 degrees) according to the scan result at operation 530. At this time, the selected optional estimation area is not necessary to match the area of one of the beams 910, 920, 930, and 940 in FIG. 9.

In order to select the optimal estimation area, a Direction-of-Arrival (DOA) estimation method based on Maximum Likelihood (ML) can be used. For example, the cost function $y=x^H DW^H a(\theta)$ can be used. $\Theta$, which maximizes the cost function result value y, is the angle estimated as the optimal angle.

At this operation, the parameters of the cost function can be configured as follows.

(four beam ports, two antenna elements per beam port)

$$x = DW^H a(\theta) + n$$

$$W = (w_1, w_2, w_3, w_4)$$

$$D = \mathrm{diag}([1, \exp(-j2\pi \sin \theta), \exp(-j4\pi \sin \theta), \exp(-j6\pi \sin \theta)])$$

$$w_i = a(\theta_i), \theta_i \in \{-67.5°, -22.5°, 22.5°, 67.5°\}$$

$$a(\theta) = \begin{bmatrix} 1 \\ \exp(-j\pi \sin \theta) \end{bmatrix}$$

Although the ML-based DOA estimation method is used for estimating the optimal angle in this embodiment, it is possible to use other methods such as Least Square Method and its equivalents and ML-based DOA estimation equivalents.

An area having a width determined based on the optimal angle estimation value θ is selected as a new scan area. It is assumed that −2° is calculated as the optimal angle. This angle is used for scanning at the next operation.

The recipient device determines whether the beam selection has completed at operation 540. In this embodiment, if all antenna elements 1051, 1052, 1053, and 1054 are allocated to one beam port and then the optimal angle is acquired through the ML-based DOA estimation method at the beam port, it is assumed that the selection procedure has completed. According to another embodiment, if the scan process has performed predetermined number of times (3 times) at operation 530 or after the number of beam ports used simultaneously in the scan procedure reaches a predetermined value (2, 4, etc.), it is determined that the beam selection has completed. However, the method for completing the selection after allocating all the antenna elements to a beam port and estimating the optimal reception beam angle gives more accurate result as compared to other methods.

Since the previous scan has been performed through four reception beam ports, the completion condition is not fulfilled yet and thus the procedure goes to operation 550.

The recipient device increases the number of antenna elements allocated to one beam port and decreases the number of beam ports to be used for entire scan. The rate of increasing the number of antenna elements allocated to one beam port and/or the rate of decreasing the number of beam ports to be used for the entire scan can be changed depending on the embodiment. However, a relatively simple method is exemplified. The recipient device increases the number of antenna elements per beam port twice (i.e., to 4), and decreases the number of beam ports to be used for scanning by half (i.e., to 2), at operation 550. Accordingly, the beam width of each beam port decreases to about half.

Figure 12:
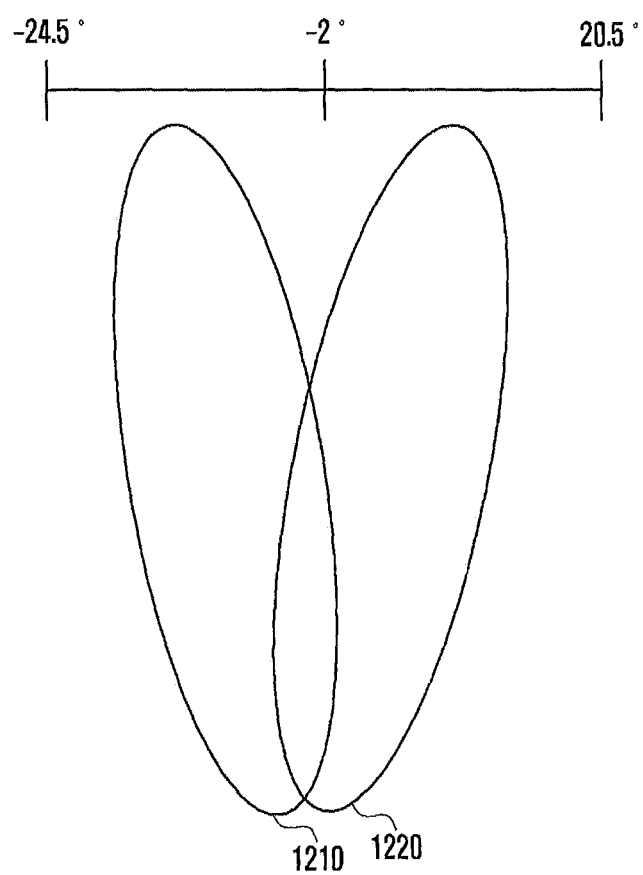
FIG. 12 illustrates reception beams in the state that two beam ports are configured according to embodiments of the present disclosure.

FIG. 12 illustrates reception beams in the state that two beam ports are configured according to embodiments of the present disclosure. For convenience of explanation, the angle of the reception beam is expressed on vertical line. Although only the angle in the horizontal direction (one direction) is used herein, the method of the present embodiment can be applied in similar manner to the case where the angle in the vertical direction is considered together with the angle in the horizontal direction.

Figure 13:
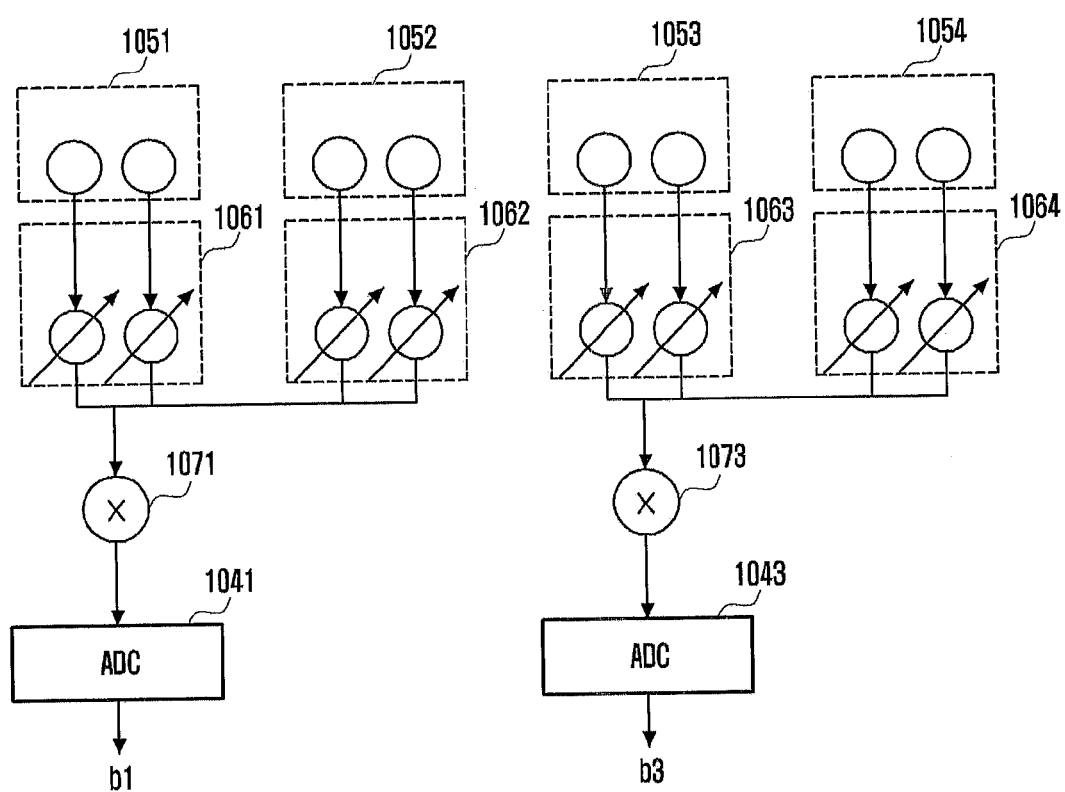
FIG. 13 illustrates beamforming configuration of the recipient device in the state that two beam ports are configured according to embodiments of the present disclosure.

FIG. 13 illustrates beamforming configuration of the recipient device in the state that two beam ports are configured according to embodiments of the present disclosure.

Referring to FIG. 13, four antenna elements 1051 and 1052 are allocated to the beam port b1. Likewise, four antenna elements 1053 and 1054 are allocated to another beam port b3. The beam ports b2 and b4 are used for other purposes or not used. As described with reference to FIGS. 7 and 8, if the number of antenna elements allocated to one beam port increases, the beam width becomes narrower. Since the beam port to which two antenna elements are allocated covers 45 degree angle, it can be configured that the beam port to which four antenna elements are allocated covers 22.5 degree angle.

Changing the number of antenna elements allocated to each beam port and changing the antenna elements allocated to each beam port can be done by summing the signals received through the antenna elements of the corresponding beam port and applying the sum value as the received signal of the corresponding beam port with manipulation of mechanical switches or coils physically.

Reducing the area covered by each beam port can be done by reducing the angle between the beam directions of each beam port. That is, when four beam ports are used, the angle between two reception beams is 45 degrees and the angle covered by each reception beam is also 45 degrees. In the case of using two beam ports, the angle between two reception beam is 22.5 and the angle covered by each reception beam is also 22.5. The angle between the reception beams may be configured regularly (45 degrees, 22.5 degrees, etc.) or irregularly depending on the embodiment.

Since −2 degrees has been estimated as the optimal angle at previous operation, the reception beam 1210 covers the area between −24.5 and −2 degrees and the reception beam 1220 covers the area between −2 and 20.5 degrees. The center angle of the reception beam 1210 is −13.25 degrees and the center angle of the reception beam 1220 is 9.25 degrees.

Figure 14:
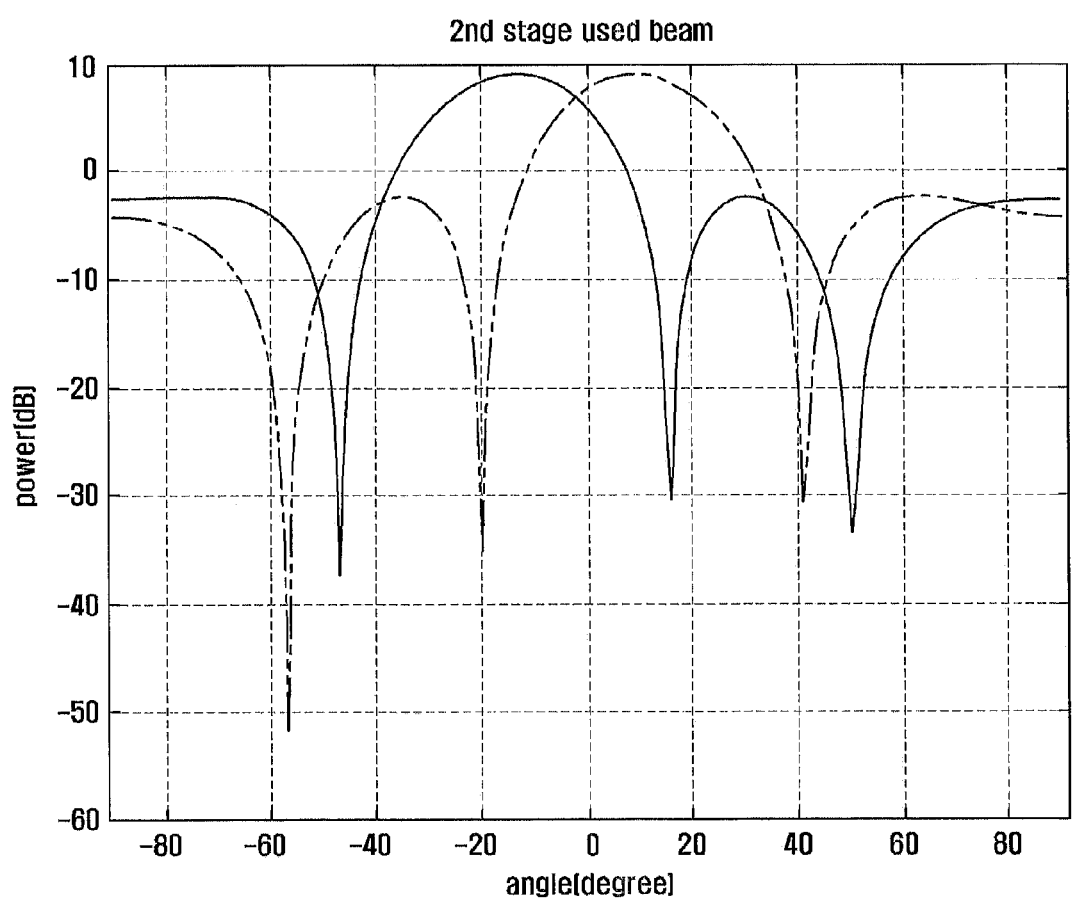
FIG. 14 illustrates a graph of the reception power according to the reception angle when the angle of the reception beam 1210 is set to −13.25 degrees and the angle of the reception beam is set to 9.25 degrees according to embodiments of the present disclosure.

FIG. 14 illustrates a graph of the reception power according to the reception angle when the angle of the reception beam 1210 is set to −13.25 degrees and the angle of the reception beam 1220 is set to 9.25 degrees. The reception power of the reception beam 1210 is peak when the reception angle is −13.5 degrees, and the reception power of the reception beam 1220 is peak when the reception angle is 9.25 degrees.

The reception device performs scanning according to the current beam configuration at operation 560. That is, the recipient device allocates four contiguous antenna elements to the beam port of each reception beam and controls the phase shifters connected to the antenna elements to receive the signal corresponding to the transmission beam selected in receiving the synchronization signal in the state that the angle of the reception beam 1210 is set to −13.25 degrees and the angle of the reception beam 1220 is set to 9.25 degrees.

Returning to operation 530, the reception device estimates the optimal reception beam angle according to the scanning result.

Likewise, the ML-based DOA estimation method can be used herein. Θ, which maximizes the cost function result value $y=^H DW^H a(\theta)$, is the angle estimated as the optimal angle.

At this operation, the parameters of the cost function may be configured as follows.

(two beam ports, four antenna elements per beam port)

$$x = DW^H a(\theta) + n$$

$$W = (w_1, w_2)$$

$$D = \text{diag}([1, \exp(-j4\pi \sin \theta)])$$

$$w_i = a(\theta_i), \theta_i \in \{-13.25°, 9.25°\}$$

$$a(\theta) = \begin{bmatrix} 1 \\ \exp(-j\pi \sin\theta) \\ \exp(-j2\pi \sin\theta) \\ \exp(-j3\pi \sin\theta) \end{bmatrix}$$

Figure 15:
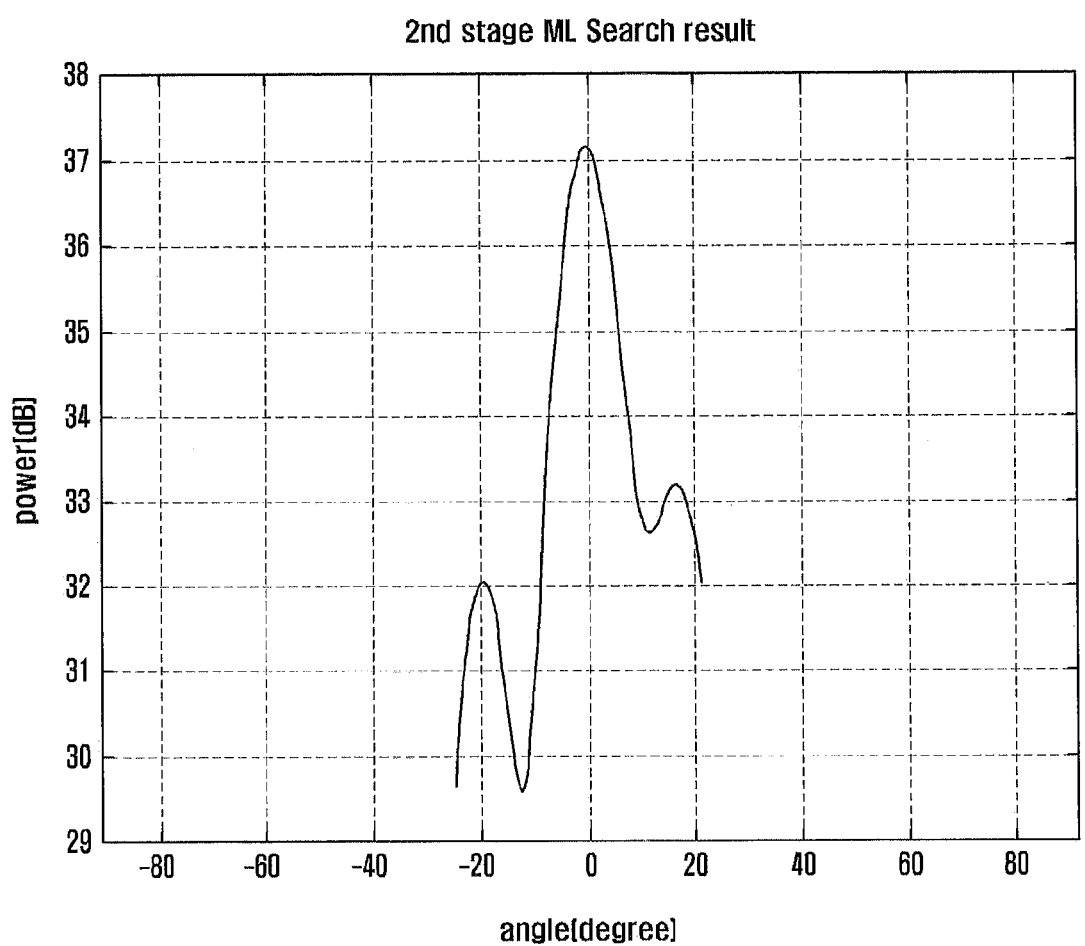
FIG. 15 illustrates a graph of the cost function calculated under the condition of two beam ports and four antenna elements per port according to embodiments of the present disclosure.

FIG. 15 illustrates a graph of the cost function calculated under the condition of two beam ports and four antenna elements per port. Since the highest cost function result value is acquired at 0 degrees, the optimal reception beam angle is estimated at 0 degrees.

The recipient device determines whether the beam angle selection has completed at operation 540. Since the optimal beam direction estimation using one beam port has not been performed, the beam angle selection has not completed. Accordingly, the procedure goes to operation 550.

The recipient device increases the number of antenna elements allocated to each beam port and decreases the number of beam port to be used at operation 550. In this embodiment, the recipient device allocates eight antenna elements to each beam port and configures one beam port to be used.

Figure 16:
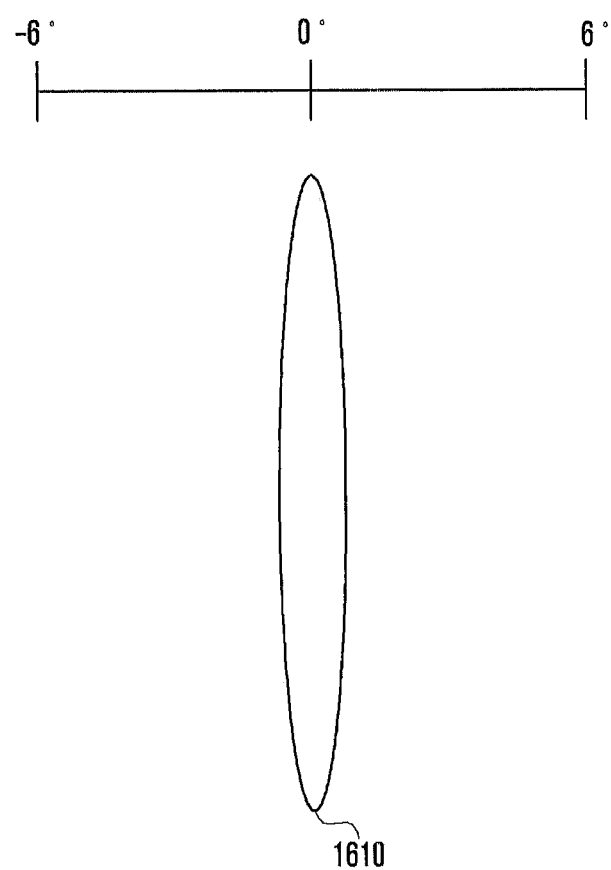
FIG. 16 illustrates reception beams in the state that one beam port is configured according to embodiments of the present disclosure.

FIG. 16 illustrates reception beams in the state that one beam port is configured according to embodiments of the present disclosure. For convenience of explanation, the angle of the reception beam is expressed on a vertical line. Although only the angle in the horizontal direction (one direction) is used herein, the method of the present embodiment can be applied in a similar manner to the case where the angle in the vertical direction is considered together with the angle in the horizontal direction.

Figure 17:
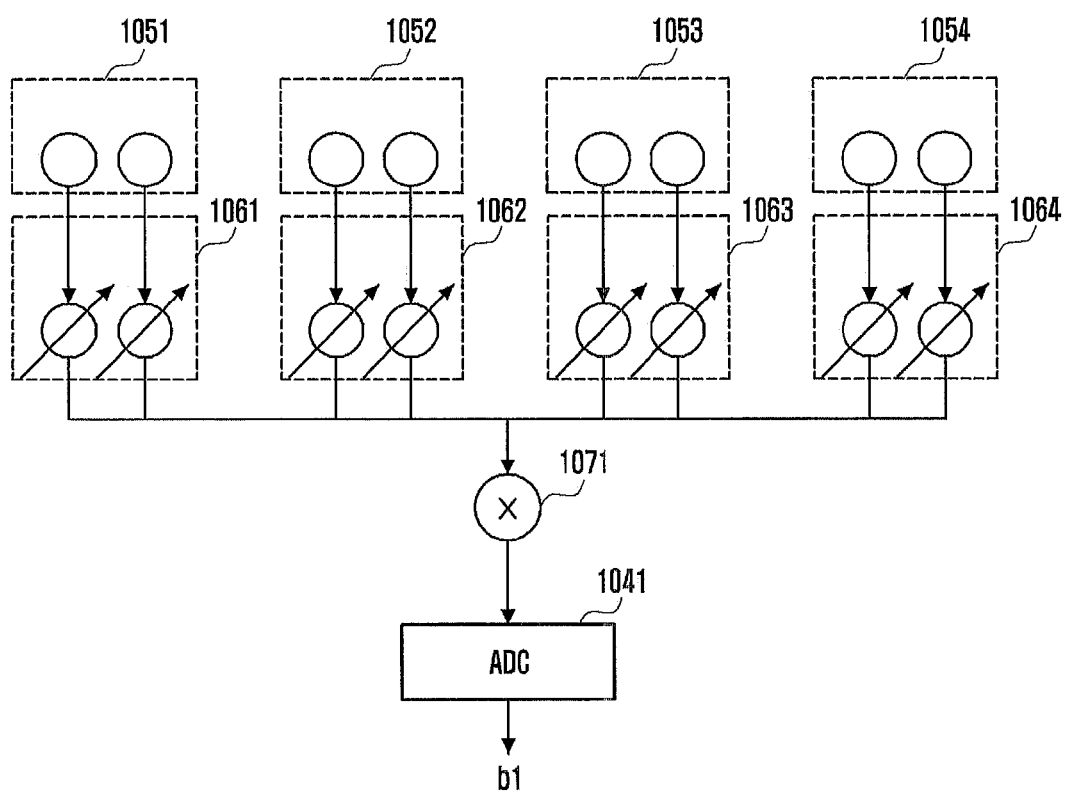
FIG. 17 illustrates beamforming configuration of the recipient device in the state that one beam port is configured according to embodiments of the present disclosure.

FIG. 17 illustrates beamforming configuration of the recipient device in the state that one beam port is configured according to embodiments of the present disclosure.

Referring to FIG. 17, all antenna elements 1051, 1052, 1053, and 1054 are allocated to one beam port b1. The other beam ports b2, b3, and b4 are used for other purposes or not used. Since the number of antenna elements allocated to one beam port has been increased, the width of the reception beam 1610 becomes narrower. The reception beam 1610 is configured to be oriented to the direction of 0 degrees. The reception beam 1610 can cover the angle area about between −6 and 6 degrees.

Figure 18:
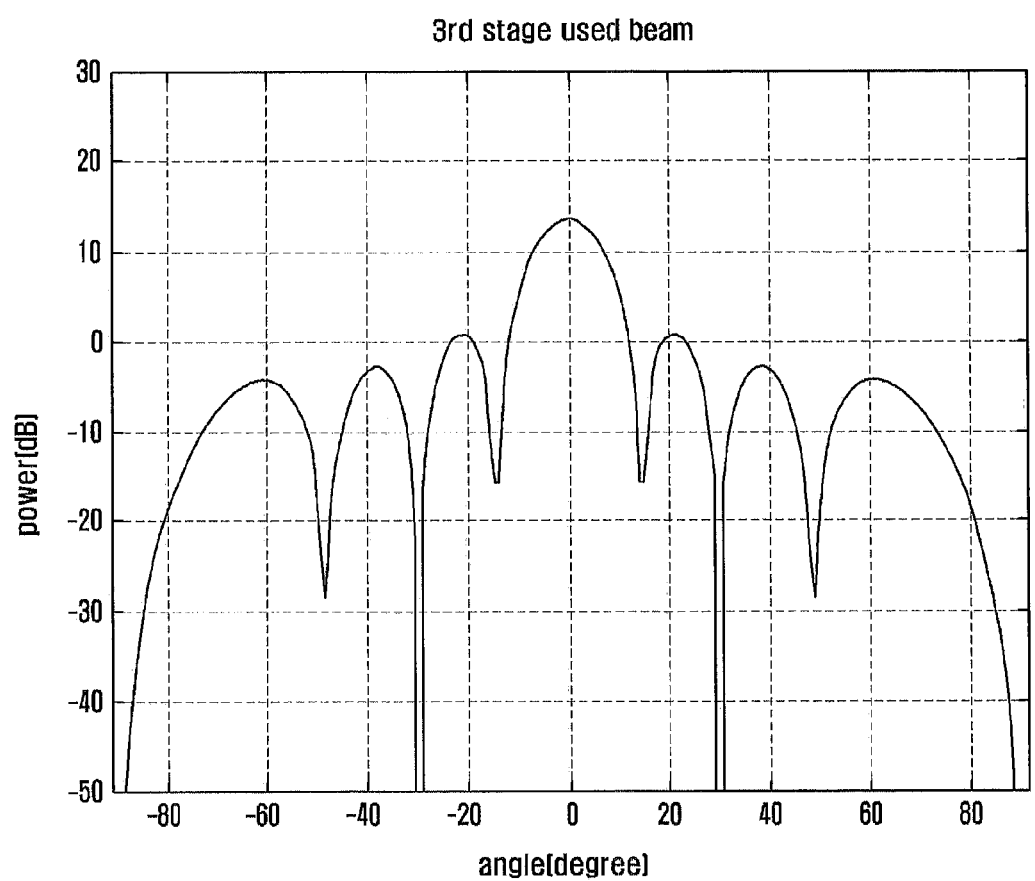
FIG. 18 illustrates a graph of the reception power according to the reception angle when the angle of the reception beam is set to 0 degrees according to embodiments of the present disclosure.

FIG. 18 illustrates a graph of the reception power according to the reception angle when the angle of the reception beam 1610 is set to 0 degrees. When the reception angle is 0, the reception power of the reception beam 1610 becomes maximum.

The recipient device scans the angle area covered by the reception beam again at operation 560. That is, the recipient device receives the synchronization signal of the transmission beam selected at operation 510 through the reception beam 1610.

The recipient device estimates the optimal reception angle using the power of the received signal again at operation 530.

Likewise, the ML-based DOA estimation method may be used herein. Θ, which maximizes the cost function result value $y = x^H DW^H a(\theta)$, is the angle estimated as the optimal angle.

At this operation, the parameters of the cost function can be configured as follows.

(one beam port, eight antenna elements per beam port)

$$x = DW^H a(\theta) + n$$

$$W = (w_1)$$

$$D = \text{diag}([1]) = 1$$

$$w_i = a(\theta_i), \theta_i \in \{0°\}$$

$$a(\theta) = \begin{bmatrix} 1 \\ \exp(-j\pi \sin\theta) \\ \exp(-j2\pi \sin\theta) \\ \exp(-j3\pi \sin\theta) \\ \exp(-j4\pi \sin\theta) \\ \exp(-j5\pi \sin\theta) \\ \exp(-j6\pi \sin\theta) \\ \exp(-j7\pi \sin\theta) \end{bmatrix}$$

Figure 19:
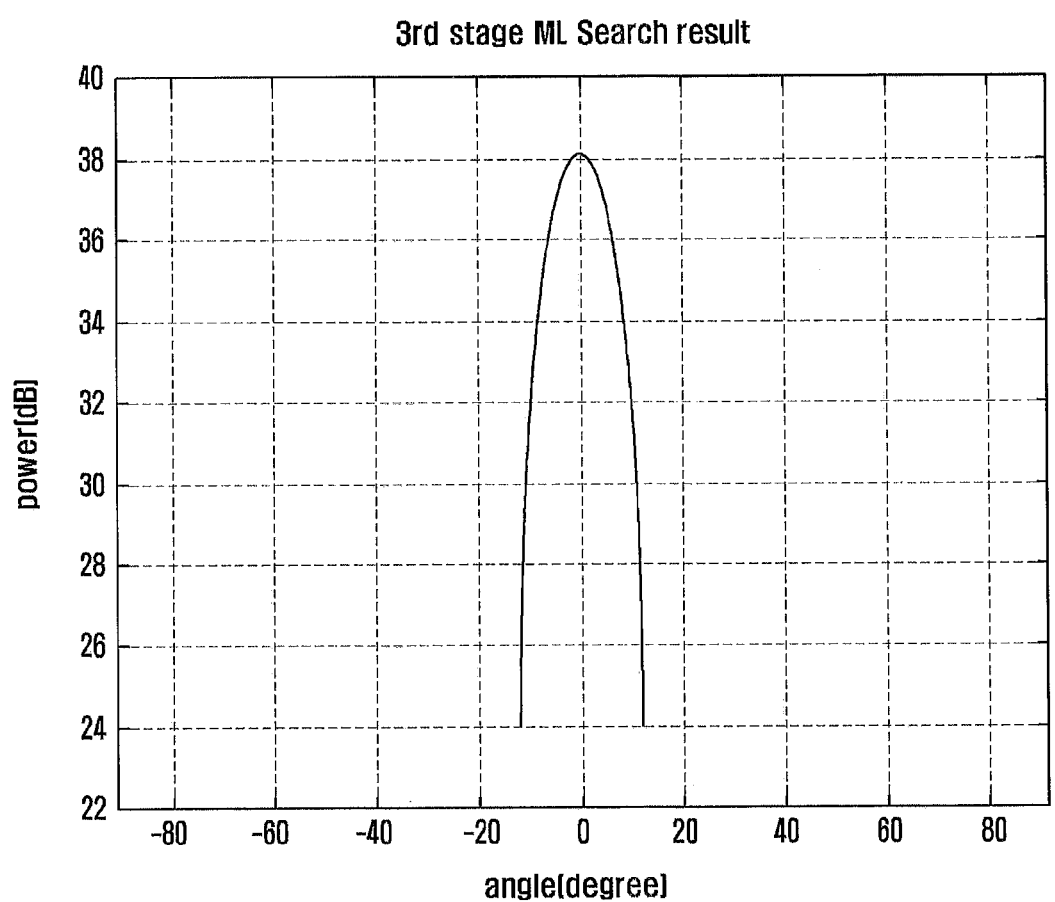
FIG. 19 illustrates a graph of the cost function calculated under the condition of one beam port and eight antenna elements per port according to embodiments of the present disclosure.

FIG. 19 illustrates a graph of the cost function calculated under the condition of one beam port and eight antenna elements per port. Since the highest cost function result value is acquired at 0 degrees, the optimal reception beam angle is estimated at 0 degrees.

Since the optimal reception beam angle estimation with one beam port has been performed, the recipient device determines that the beam direction selection has completed at operation 540 and ends the procedure. Afterward, the recipient device attempts signal reception in the reception beam direction selected finally. If the reception power becomes equal to or less than a predetermined level or before a specific event such as handover occurs, the recipient device continues the reception operation in the selected reception beam direction.

The above described embodiment may be generalized as follows. That is, the beam selection method of the present disclosure allocates a same number of antenna elements to $2^B$ beam ports, configures the same angle between the reception beams of the beam port to receive signal through an entire area (−90 to ~90 degrees), and performs ML-based DOA estimation. The recipient device decreases the number of beam ports to half and increases the number of antenna elements per beam port twice, and decreases the angle between the reception beams of each beam port to half, and performs estimation procedure. In this way, the estimation procedure is repeated as many as B+1 time until the number of beam ports reaches 1 to estimate the optimal reception beam direction. For example, if the number of beam ports is 8 and the number of antenna elements is 64, or if the number of beam ports is 4 and the number of antenna elements is 16, it is possible to perform the optimal reception beam port direction estimation in a similar way.

Here, it is assumed that the same number of antenna elements is allocated to all beam ports. In an alternative embodiment, however, when the number of antenna elements is not divided by the number of beam ports, different numbers of antenna elements may be allocated to the beam ports. For example, a beam port may be allocated four antenna elements while another beam port is allocated five antenna elements. In this case, eight or nine antenna elements may be allocated to decrease the number of beam ports and increase the number of antenna elements allocated per beam port to perform the optimal reception beam angle estimation procedure repeatedly to obtain the efficiency similar to the above described embodiment. At this time, the minimum value of the number of antenna elements of the beam port at the next phase has to be greater than the maximum value of the number of antenna elements of the beam port at the previous phase.

As described above, the beam selection apparatus and method of the present disclosure is capable of selecting a reception beam direction efficiently in a beamforming system.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions are stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module can advantageously be configured to reside on the addressable storage medium and configured to be executed on one or more processors. Thus, a module can include, byway of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules can be combined into fewer components and modules or further separated into additional components and modules. In addition, the components and modules can be implemented such that they execute one or more CPUs in a device or a secure multimedia card.

The foregoing disclosure has been set forth merely to illustrate the disclosure and is not intended to be limiting. Since modifications of the disclosed embodiments incorporating the spirit and substance of the disclosure can occur to persons skilled in the art, the disclosure should be construed to include everything within the scope of the appended claims and equivalents thereof.

Although the present disclosure has been described with an examples, various changes and modifications may be suggested to one skilled in the art. It is intended that the present disclosure encompass such changes and modifications as fall within the scope of the appended claims.

What is claimed is:

1. A beam direction selection method of a reception device including a plurality of antenna elements in a wireless communication system using beamforming, the method comprising:
    acquiring a first reception beam angle estimated as optimal by:
        allocating a plurality of antenna elements to a third number of beam ports, wherein a first number of antenna elements are allocated to each beam port of the third number of beam ports, and
        scanning first signals using the third number of beam ports; and
    acquiring a second reception beam angle estimated as optimal by:
        allocating the plurality of antenna elements to a a fourth number of beam ports, wherein a second number of antenna elements are allocated to each beam port of the fourth number of beam ports, and
        scanning second signals using the fourth number of beam ports based on the first reception beam angle,
    wherein the second number is greater than the first number, and the third number is greater than the fourth number.

2. The method of claim 1, wherein acquiring of the first reception beam angle comprises:
    configuring an angle between reception beams corresponding to the each beam port of the third number of beam ports to a first angle;
    receiving the first signals on the reception beams corresponding to the each respective beam port of the third number of beam ports; and
    acquiring the first reception beam angle based on power of the received first signals.

3. The method of claim 2, wherein configuring the angle between the reception beams corresponding to the each beam port of the third number of beam ports to be the first angle comprises:
adjusting the angle between the reception beams by adjusting phase shift values of phase shifters connected to the antenna elements allocated to the respective each beam port.

4. The method of claim 2, wherein acquiring the second reception beam angle comprises:
configuring an angle between reception beams corresponding to each beam port of the fourth number of beam ports to half of the first angle;
receiving the second signals on the reception beams corresponding to the each beam port of the fourth number of beam ports; and
acquiring the second reception beam angle based on the power of the received second signals.

5. The method of claim 4, wherein the second number of antennas is twice of the first number of antennas, and
wherein the third number of beam ports is twice the fourth number of beam ports.

6. The method of claim 1, further comprising repeating acquiring reception beam angles by scanning with an increasing number of antenna elements allocated to each beam port until all antenna elements are allocated to one beam port.

7. The method of claim 1, wherein the first and the second reception beam angles are in a single direction, the direction being one of: a horizontal direction and a vertical direction.

8. The method of claim 1, wherein the first and the second reception beam angles are in a combination of two directions: a horizontal direction with a vertical direction.

9. The method of claim 1, further comprising: until a reception power level becomes equal to or less than a predetermined level, continuing receiving signals based on the second reception beam angle.

10. A reception beam direction selection apparatus in a wireless communication system using beamforming, the apparatus comprising:
a plurality of antenna elements; and
a controller configured to:
acquire a first reception beam angle estimated as optimal by allocating a plurality of antenna elements to a third number of beam ports and scanning first signals using the third number of beam ports, wherein a first number of antenna elements are allocated to each beam port of the third number of beam ports, and
acquire a second reception beam angle estimated as optimal by allocating the plurality of antenna elements to a fourth number of beam ports and scanning second signals using the fourth number of beam ports based on the first reception beam angle, wherein a second number of antenna elements are allocated to each beam port of the fourth number of beam ports,
wherein the second number is greater than the first number, and the third number is greater than the fourth number.

11. The apparatus of claim 10, wherein the controller is further configured to:
repeat acquiring the reception beam angles by scanning with an increasing number of antenna elements allocated to each beam port until all antenna elements are allocated to one beam port.

12. The apparatus of claim 10, wherein the controller is further configured to:
configure an angle between reception beams corresponding to each beam port of the third number of beam ports to a first angle,
receives the first signals on the reception beams corresponding to each beam port of the third number of beam ports, and
acquire the first reception beam angle based on power of the received first signals.

13. The apparatus of claim 12, further comprising phase shifters coupled to antenna elements allocated to each beam port, and
wherein the controller is further configured to adjust the angle between the reception beams by adjusting phase shift values of the phase shifters.

14. The apparatus of claim 12, wherein the controller is further configured to:
configure an angle between reception beams corresponding to the each beam port of the fourth number of beam ports to half of the first angle,
receive the second signals on the reception beams corresponding to the each beam port of the fourth number of beam ports, and
acquire the second reception beam angle based on the power of the received second signals.

15. The apparatus of claim 14, wherein the second number of antennas is twice of the first number of antennas, and
wherein the third number of beam ports is twice of the fourth number of beam ports.

16. The apparatus of claim 10, wherein the first and the second reception beam angles are in a single direction, the direction being one of: a horizontal direction and a vertical direction.

17. The apparatus of claim 10, wherein the first and the second reception beam angles are in a combination of two directions: a horizontal direction with a vertical direction.

18. The apparatus of claim 10, wherein the controller is further configured to: until a reception power level becomes equal to or less than a predetermined level, continuing receiving signals based on the second reception beam angle.

19. A mobile station comprising:
a radio transmitter;
a plurality of antenna elements; and
a controller configured to:
acquire a first reception beam angle estimated as optimal by allocating a plurality of antenna elements to a third number of beam ports and scanning first signals using the third number of beam ports, wherein a first number of antenna elements are allocated to each beam port of the third number of beam ports, and
acquire a second reception beam angle estimated as optimal by allocating the plurality of antenna elements to a fourth number of beam ports and scanning second signals using the fourth number 4 of beam ports based on the first reception beam angle, wherein a second number of antenna elements are allocated to each beam port of the fourth number of beam ports,
wherein the second number is greater than the first number, and the third number is greater than the fourth number.

20. The mobile station of claim 19, wherein the controller is further configured to:

configure an angle between reception beams corresponding to the each beam port of the third number of beam ports to a first angle,
receives the first signals on the reception beams corresponding to the each beam port of the third number of beam ports, and
acquire the first reception beam angle based on power of the received first signals.

\* \* \* \* \*